United States Patent [19]

Grabovszky

[11] Patent Number: 5,399,062
[45] Date of Patent: Mar. 21, 1995

[54] PROCESS AND DEVICE TO POSITION BOBBINS

[75] Inventor: Gerhard Grabovszky, Lenting, Germany

[73] Assignee: Rieter Ingolstadt Spinnereimaschinenbau AG, Ingolstadt, Germany

[21] Appl. No.: 107,348

[22] Filed: Aug. 16, 1993

[30] Foreign Application Priority Data

Sep. 1, 1992 [DE] Germany .................. 42 29 112.7

[51] Int. Cl.⁶ .................. B65G 57/04; B65G 57/22
[52] U.S. Cl. .................. 414/792.6; 414/792.9; 414/786; 198/487.1; 198/803.12; 198/429; 242/35.5 A
[58] Field of Search ............ 198/465.1, 465.4, 487.1, 198/803.12, 803.01, 434, 430, 429; 414/792.6, 792.9, 783, 786; 242/35.5 A

[56] References Cited

U.S. PATENT DOCUMENTS

| | | |
|---|---|---|
| 3,788,054 | 1/1974 | Haussmann et al. . |
| 3,906,712 | 9/1975 | Miyazaki et al. . |
| 4,088,226 | 5/1978 | Vicek et al. . |
| 4,650,062 | 3/1987 | Uchida . |
| 4,729,709 | 3/1988 | Raasch . |
| 4,730,733 | 3/1988 | Kawamura et al. . |
| 4,763,773 | 4/1988 | Kawarabashi et al. . |
| 4,783,021 | 11/1988 | Nagasawa . |
| 4,810,155 | 3/1989 | D'Angnolo . |
| 4,813,222 | 3/1989 | Fukuda et al. ............ 198/803.01 X |
| 4,850,473 | 7/1989 | MacWilliams et al. ..... 198/465.1 X |
| 4,875,572 | 10/1989 | Kiriake ................ 242/35.5 A X |
| 4,924,999 | 5/1990 | Kikuchi et al. ............ 198/487.1 X |
| 5,277,229 | 1/1994 | Kikuchi et al. ............ 242/35.5 A X |

FOREIGN PATENT DOCUMENTS

| | | |
|---|---|---|
| 3009361A1 | 9/1981 | Germany . |
| 3707553A1 | 9/1988 | Germany . |
| 3816164A1 | 11/1989 | Germany . |

*Primary Examiner*—Andres Kashnikow
*Assistant Examiner*—Lesley D. Morris
*Attorney, Agent, or Firm*—Dority & Manning

[57] ABSTRACT

The invention relates to a process for positioning conical or cylindrical cross-wound bobbins on a textile machine. The bobbins are rotated and tilted if required in the area between a conveyor belt and an intermittent conveyor and positioned by the intermittent conveyor for pick-up by a grasper of a palletizing device. Conveyor belt and intermittent conveyor, as well as a rotating device and/or a tilting device, are installed on the textile machine. The intermittent conveyor is a ratchet conveyor with catches which grasp the bobbins by the protruding tubes and pushes them into a predetermined position. During the back stroke, the catches move out of the way of the tube ends.

36 Claims, 3 Drawing Sheets

PROCESS AND DEVICE TO POSITION BOBBINS

BACKGROUND OF THE INVENTION

The instant invention relates to a process and to a device for positioning bobbins.

A textile machine with a device for the transfer of cross-wound bobbins into a box-shaped conveying device is known from DE 34 41 778 A1. The device is installed at the front of the textile machine and receives the cross-wound bobbins delivered by the textile machine. A conveyor belt which can be driven intermittently is installed on the device. In this manner the device is gradually filled with cross-wound bobbins. As soon as four cross-wound bobbins are present on the conveyor belt, the cross-wound bobbins are grasped at their circumference, are swivelled and are deposited in the box-shaped conveying container. In such a device, it is a disadvantage that the conveyor belt may damage the outer windings of the cross-wound bobbins during positioning. Furthermore the depositing device is occupied by bobbins during the positioning process so that the effectiveness of the device remains relatively low. The speed of the removing device is not satisfactory, especially when the cross-wound bobbins are delivered from the textile machine on two conveyor belts.

DE 38 16 164 A1 discloses an automatic bobbin palletizing device in which individual bobbins are taken up by means of a grasper from a conveyor belt with positioning arbors and are deposited on pallets. The bobbins are delivered from the textile machine on two conveyor belts and are positioned on the conveyor belt with the arbors by means of a transfer device. The arbors make it possible to align the bobbins in a centered manner. It is a disadvantage in a device of this type that relatively much space is required at the front of the textile machine because the bobbins must be placed by two conveyor belts extending over the front of the textile machine on an additional, expensive conveyor belt equipped with arbors. It is a further disadvantage that the grasper is able to deposit only one bobbin at a time on the pallet. For this reason a great number of movements is required, making it difficult to process the delivered bobbins rapidly.

OBJECTS AND SUMMARY OF THE INVENTION

It is therefore a principal object of the invention to create a device which efficiently positions the bobbins delivered at a textile machine and which does so in a space-saving manner, so that the bobbins can be deposited on a pallet. Additional objects and advantages of the invention will be set forth, in part, in the following description, or will be obvious therefrom, or may be learned by practice of the invention.

According to the invention, the bobbins are prepared on the textile machine for removal by a grasper of the palletizing device. For this, they are rotated and tilted and positioned by the intermittent conveyor at predetermined locations as required, i.e. when the orientation of the bobbins is not as desired. Thus, the grasper is able to fetch the bobbins at these predetermined locations and to convey them to a pallet or a container. The execution of all these bobbin movements on the textile machine makes it possible to construct the textile machine in a space-saving manner. Thanks to the installation of the positioning device, the machine requires no additional constructive space. Retrofitting as well as original outfitting of the textile machine poses no problems.

It is especially advantageous if the intermittent conveyor constitutes a bobbin package with a number of positioned bobbins and if this number is equal to the number of bobbins deposited in a row on a pallet. This makes it possible for several bobbins to be positioned and to be deposited on the pallet or in a container in one single palletizing process. Thus very efficient palletizing is made possible. As a result, the time during which the bobbins wait on the textile machine to be picked up is very short.

It is advantageous for the intermittent conveyor and the grasper of the palletizing device to be able to prepare the same depositing pattern. This ensures that the prepared bobbins match the arrangement of the graspers at the lifting unit of the palletizing device so that the palletizing device is able to operate efficiently.

By providing a tilting and/or rotating device and an intermittent conveyor on the textile machine, space-saving construction is advantageously ensured. The intermittent conveyor is advantageously installed on an end stock of the textile machine. This allows for a simple construction of the intermittent conveyor since it does not require its own frame. To make it possible for the device to be easily retrofitted on the textile machine, it is advantageous for the tilting device and the intermittent conveyor to be of a length which is substantially equal to that of the end stock of the textile machine. The construction of the textile machine need thus not be changed substantially.

The number and the arrangement of the graspers of a lifting unit of the palletizing device is preferably equal to the number and arrangement of the positioned bobbins on the intermittent conveyor. This allows for efficient and rapid removal of the positioned bobbins from the textile machine. If the lifting unit is installed on the palletizing device so that it can be replaced, an adaptation to different depositing patterns on the pallets is possible. The intermittent conveyor is preferably also designed so as to be replaceable on the textile machine with respect to the arrangement and the number of the bobbins to be positioned.

When the graspers on the lifting unit grasp the bobbins by the inner surface of their tubes, non-destructive treatment of the windings of the bobbin is achieved, since the bobbin is not touched in such manipulation.

The intermittent conveyor is preferably a ratchet conveyor with catches which engage at the protruding tubes of the bobbins so that the catches push the bobbins in a conveying direction into a predetermined position. In their back-stroke the catches come out of the tube ends. On the one hand this advantageously ensures that the position of the bobbins, in particular of small and light bobbins, is not changed. On the other hand this also ensures that the yarn windings of the bobbins are not touched by the withdrawing catches and can therefore not be damaged in this manner. The catches preferably withdraw through a holding-down device which bears upon the catches during the back stroke. The catches are preferably installed in a catch strip on a catch holder to position several bobbins. This catch strip is actuated pneumatically. If the number of catches in the catch strip is equal to the number of bobbins in a row on the pallet to be loaded, a suitable grasper makes it possible to unload the textile machine rapidly. When the pattern of deposit on the pallet is changed it is advantageous if the catch strip and the lifting unit can be replaced. In this manner an adjustment for a new number and arrangement of the bobbins to be positioned can be made with little assembly work being required.

To ensure non-destructive treatment of the winding on the bobbin, the latter is supported on a roller track. This reduces the friction on the outside of the bobbin to a minimum so that non-destructive treatment of the bobbin is ensured.

If the roller strips of the roller track are placed at different heights, the centering of the bobbin over its circumference is ensured. This centering is preferably carried out independently of the bobbin diameter.

In order to recognize whether the catch strip matches the number and arrangement of positions assigned to the lifting unit, automatically readable markings are placed on the catch strip. This recognition may be by electronic, optical or mechanical means. When the lifting unit and the catch strip do not match up, a signal is advantageously transmitted to the operator of the device. An operational error on the device is thus avoided.

The invention is described below through examples.

DESCRIPTION OF THE PREFERRED EMBODIMENTS

Figure 1:
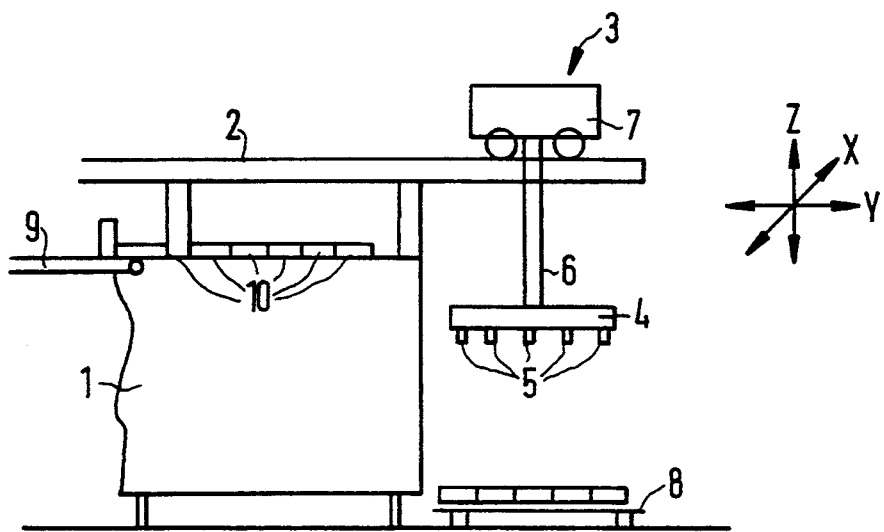
FIG. 1 shows a palletizing device.

Reference will now be made in detail to the presently preferred embodiments of the invention, one or more examples of which are illustrated in the accompanying drawings. Each example is provided by way of explanation of the invention, not limitation of the invention. For example, features illustrated or described as part of one embodiment, can be used on another embodiment to yield a still further embodiment. The numbering of components in the drawings is consistent throughout the application, with the same components having the same number in each of the drawings.

FIG. 1 shows a palletizing device 3 which is located at the front of the textile machine 1. The palletizing device 3 is mounted so as to be capable of being shifted on a rail 2 installed on the textile machine 1. The palletizing device 3 consists in this embodiment of a shifting unit 7 and a lifting unit 4. Graspers 5 are installed on the lifting unit 4 and are able to pick up bobbins 10 on the textile machine and to deposit them on the pallet 8. Shifting unit 7 and lifting unit 4 are connected with each other via a belt 6. The length of belt 6 can be changed, so that the lifting unit 4 can be lifted and lowered on the one hand until it is under the shifting unit 7 and on the other hand to the level of a pallet 8. As shown by the double arrows of FIG. 1, the movement of the bobbins in Z-direction is carried out by the lifting unit 4. The directions of movement X and Y are travelled by the shifting unit 7. The shifting unit 7 travels in Y-direction to pallet 8 after bobbin pick-up at the textile machine 1 and thus shifts the lifting unit 4 in X-direction until it comes to a stop over a free space on the pallet 8. The lifting unit 4 is then lowered on the pallet 8 and the bobbins 10 are released from the graspers.

The graspers 5 advantageously reach into a tube 11 of bobbin 10. This prevents contact with the outer yarn layers of the bobbins 10 which are thus not damaged. The graspers 5 can for instance be actuated pneumatically in that friction surfaces are spread out of a conical element, the friction surfaces bearing upon the inside of the tube 11 and thus securely grasping the tube 11 together with bobbin 10.

The palletizing device 3 is especially advantageous when the bobbins 10 are delivered on the textile machine 1 on two parallel conveyor belts 9. This makes it possible for the bobbins 10 to be positioned gradually on the end stock of the textile machine 1 downstream of the two conveyor belts 9. As soon as a row of bobbins 10 is set up downstream of one of the conveyor belts 9, the shifting unit 7 travels up to the positioned bobbins, grasps them and deposits them on the pallet 8. In the meantime another bobbin row can be positioned downstream of the second conveyor belt 9.

With the palletizing device 3 according to the invention it is especially advantageous that a minimum of space is required at the front of the textile machine 1. Only enough room for one pallet must be provided in front of the textile machine 1. This allows for optimum utilization of the space available in the textile machine hall. Thanks to the short projection of the palletizing device 3 at the front of the textile machine it is possible to lay the rail 2 without support on the hall floor to beyond the pallet 8. Free access to the textile machine 1 is thus ensured.

Figure 2:
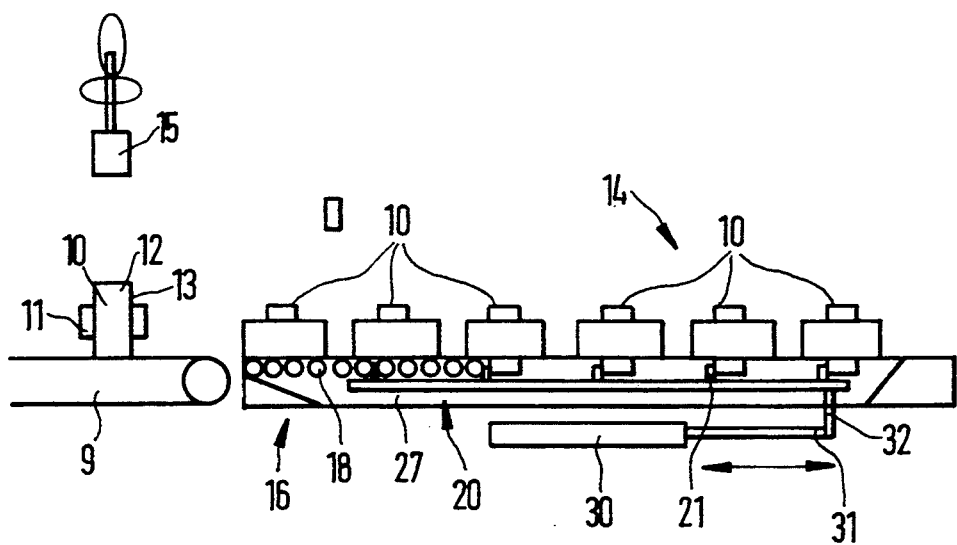
FIG. 2 shows a positioning device for bobbins.

In FIG. 2, an intermittent conveyor 14 which follows the conveyor belt 9 is shown. A bobbin 10 is present at the end of the conveyor belt 9. The tube 11 protrudes beyond the forward surfaces 13 of the bobbin 10. A rotating and/or tilting device 15 is sketched in above the bobbin 10. This device 15 grasps the bobbin 10 and rotates it by 180°. This is necessary if conical bobbins are involved so that the conicity of all the bobbins may point into one direction, or when it is intended that the yarn end fixation of all bobbins 10 be located on one side. After the rotation of the bobbin 10 it is tilted by 90° so that the bobbin axis is no longer lying horizontally, as in the delivered state, but is now vertical. Any manner of known tilting devices can be used to tilt the bobbin 10. For example, a tilting device which causes the bobbin 10 to tilt as a result of gravity or movement against an obstacle can be provided between the conveyor belt 9 and the intermittent conveyor 14.

Following the rotating and tilting process the bobbin 10 comes to lie with a vertical axis on the intermittent conveyor 14. One of the forward surfaces 13 lies on a roller track 16. The bobbin 10 can be conveyed on this roller track 16 to the end of the textile machine 1. Conveying is carried out by means of the intermittent conveyor 14. The intermittent conveyor 14 moves the bobbin 10 on the one hand to the end of the textile machine 1 and on the other hand positions the following bobbins 10 thereafter at predetermined locations if the end position is already occupied by a bobbin 10. Depending on the pattern of deposit on the pallet 8 and the diameter of the bobbins 10, a greater or smaller number of bobbins are positioned by the intermittent conveyor 14. 4, 5 or 6 bobbins in a row have proven to be advantageous.

The intermittent conveyor 14 of the shown embodiment is configured so that one bobbin more than the number to be received in the palletizing device can be deposited. This has the advantage that an additional bobbin 10 is prepared for positioning already during the palletizing process of the forward bobbins 10 which are already correctly positioned, and that a new bobbin package can be readied with corresponding speed after pick-up of the first bobbin package. Furthermore this offers the advantage that sufficient space is available for the tilting movement of the standing bobbin 10 at the end of the conveyor belt 9, without change in the position of bobbins 10 which have already been positioned.

As soon as a bobbin 10 is tilted and deposited on the roller track 16, the intermittent conveyor receives a signal. A pneumatic cylinder 30 is actuated if one more bobbin 10 can be received in the forward positions. The pneumatic cylinder 30 pulls back a cylinder rod 31 once and pushes it out again. At the end of the cylinder rod 31 a catch strip 20 is installed via a connecting element 32. There are as many catches 21 on the catch strip 20 as the number of bobbins which can be picked up by the lifting unit 4. The lifting movement of the pneumatic cylinder 30 causes the catch strip 20 to be pulled back so far that the catches 21 grasp the bobbin 10 standing at the last position at its protruding tube 11 and to push it into the next to last position. If bobbins 10 are already present in the other positions, the catches 21 swivel away during the forward stroke so that the bobbins 10 which are already in position are not shifted. During the back stroke the catches 21 reach into the protruding tubes 11 and move the bobbins 10 forward by one position.

Figure 3:
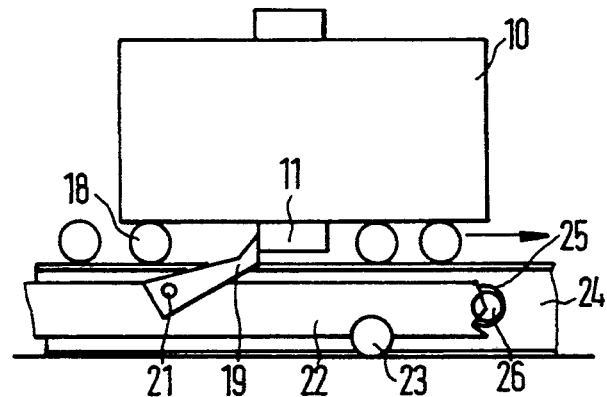
FIGS. 3, 4, and 5 show a section from an intermittent conveyor.
Figure 4:
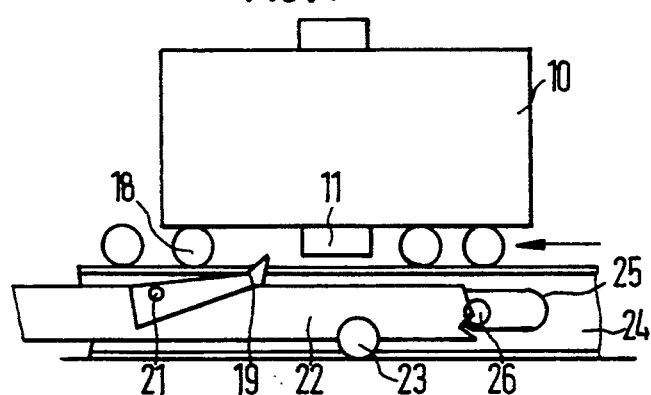
Figure 5:
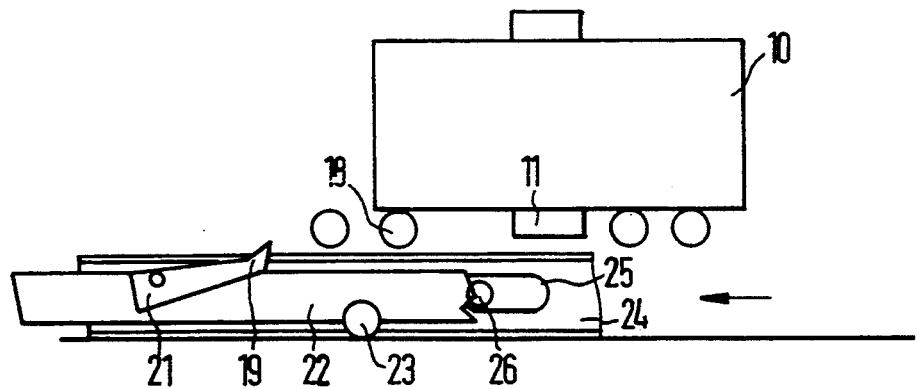

In FIGS. 3 to 5 the functioning of the catch strip 20 is shown in detail. The bobbin 10 lies on a roller strip 18. The catch 21 engages the protruding tube 11 when the intermittent conveyor 14 moves in the direction of the arrow. Bobbin 10 is then also moved in the direction of the arrow. The catch 21 is installed on a catch holder 22. The catch holder 22 is mounted via a roller 23 on the base in such manner as to be mobile. The intermittent conveyor 14 remains stopped in this position until it receives a new signal for the positioning of another bobbin 10. As soon as the signal has been given, the pneumatic cylinder 30 first moves the catch holder 22 in the direction of the arrow of FIG. 4. At the same time the catch 21 is pressed down against the edge of a recess in the holding-down device 24. This advantageously prevents the tip of the catch 21 from gliding along the yarn layers of the forward surface 13 of the bobbin 10 and from damaging the bobbin 10. It further ensures that as the catch 21 moves beneath a bobbin 10, the latter's position will not be changed.

The catch holder 22 is moved in the direction of the arrow in relation to the holding-down device 24 until a pin 26 makes contact with the end of an oblong hole 25 in the holding-down device 24 and moves it also in the direction of the arrow. This is shown in FIG. 5. In this position the catch holders 22 and the holding-down device 24 are moved with their catch 21 until they are behind the last bobbin 10 on the intermittent conveyor. The pneumatic cylinder 30 is then in one of its end positions. During the back stroke of the pneumatic cylinder 30, the catch holder 22 is first moved until the pin 26 has reached the other end of the oblong hole 25. Following this position the catch holder 22 as well as the holding-down device 24 are moved again. The catch 21 has thereby emerged from the recess in the holding-down device 24 and exerts a resistance against a bobbin 10 so that this bobbin 10 is pushed forward by one position. It should be noted here that the friction between the catch holder 22 and the holding-down device 24 varies so much that the pneumatic cylinder 30 first moves the catch holder 22 via cylinder rod 31 and connecting element 32, and that the connecting element 32 first moves the catch holder 22 while the holding-down device 24 is moved along only once the pin 26 has made contact in the oblong hole 25. This is ensured by mounting on rollers 23 and a sliding mounting of the holding-down device 24 on the catch strip 22 base.

Figure 6:
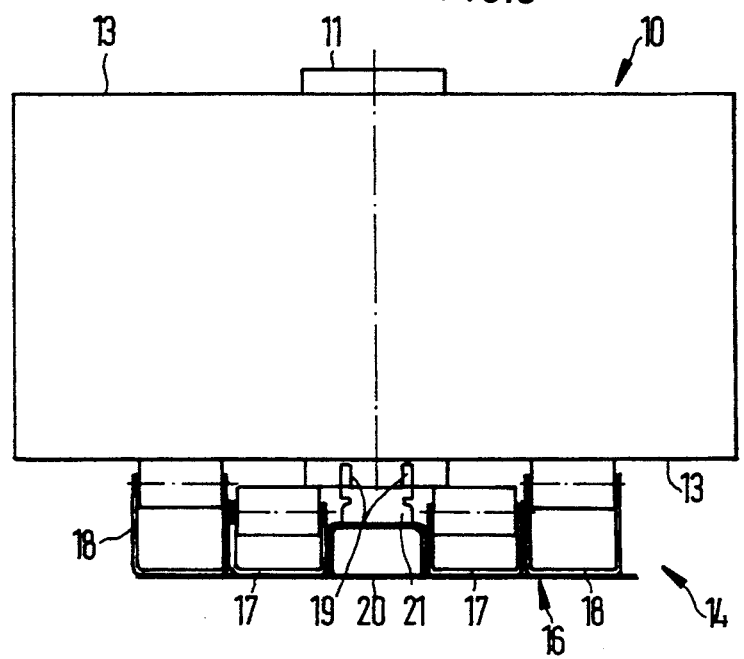
FIGS. 6 and 7 show a cross-section of an intermittent conveyor.
Figure 7:
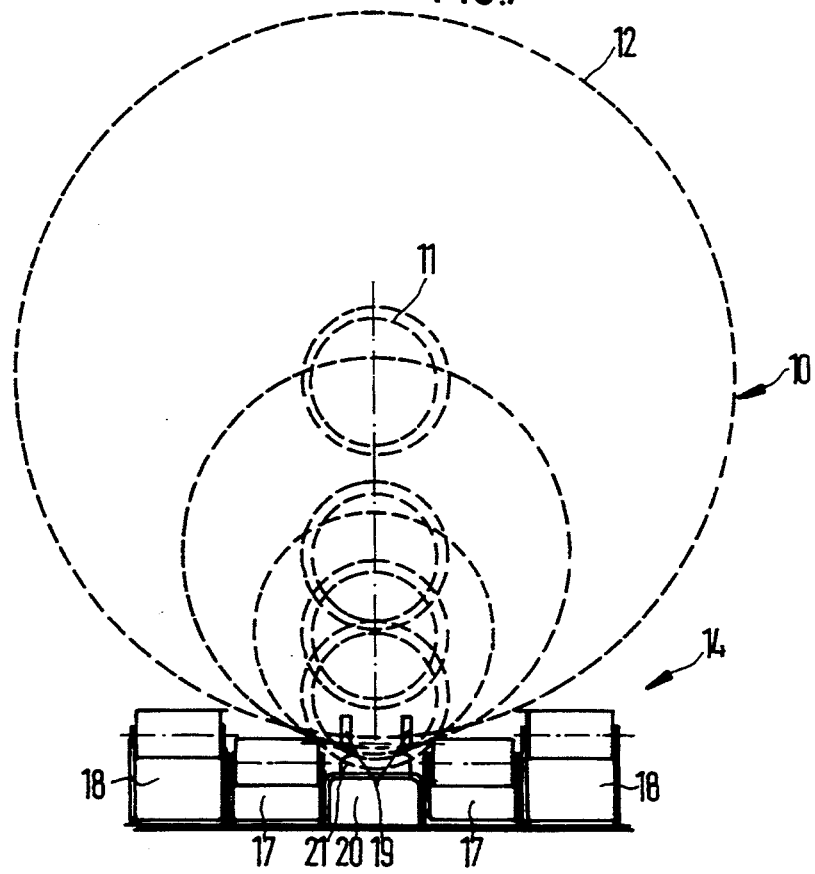

FIGS. 6 and 7 show a cross-section through an intermittent conveyor 14. FIG. 6 shows an intermittent conveyor with prone bobbin 10. Bobbin 10 lies here with its forward surface 13 on the roller track 16. The roller track 16 consists of an inner roller strip 17 and an outer roller strip 18. In the ideal case the windings of the bobbin 10 then rest on the outer roller strip 18 and the tube 11 on the inner roller strip 17. The catch 21 installed in the catch strip 20 engages the protruding tube 11 of the bobbin 10. Two slaving pins 19 on the catch 21 advantageously ensure that the bobbin 10 is always positioned in a centered position in relation to the catch strip 20.

FIG. 7 shows an intermittent conveyor 14 on which the bobbins 10 are standing on their bobbin circumference 12. Such an arrangement of the bobbins 10 on the intermittent conveyor 14 is advantageous when no positioning of the bobbins 10 is needed. This is the case for example when batches are changed on the textile machine, when all the bobbins must be replaced and it is important that the textile machine be emptied as rapidly as possible. The intermittent conveyor 14 moves the bobbins 10 in this case on their circumferential surface 12 to the end of the machine and causes the bobbins 10 to fall into a container placed at that location. When batches are changed, bobbins 10 of all diameters are involved. The intermittent conveyor 14 is able to convey all diameters thanks to the arrangement of the roller strips 17 and 18 and thanks to the catch strip 20.

To ensure safe conveying of the bobbins 10, the inner roller strip 17 is lower than the outer roller strip 18 in the roller track 16. Furthermore the catch strip 20 is lower than the inner roller strip 17. This creates a trough in which the bobbins 10 center themselves whatever their diameter may be, and can be suitably taken along by the catch 21. The bobbins 10 are thus safely prevented from rolling off laterally.

The arrangement of the roller strips 17 and 18 has the further advantage that the bobbins 10 are centered as they are transferred from the conveyor belt 9 to the intermittent conveyor 14. If a tilting device is installed near the intermittent conveyor, this ensures reliable tilting of the bobbin 10 and reliable alignment of the bobbin 10 with respect to its lateral placement.

The simple and space-saving construction is an advantage of the palletizing device. At the front of the textile machine 1, only enough room for one pallet 8 need be provided. The free passage at the front of the textile machine is not interfered with significantly.

The installation of the intermittent conveyor 14 on the end stock of the textile machine 1 ensures advantageously that the bobbins 10 can be readied for orderly pick-up without any additional construction space being required. Pick-up can be carried out by means of the palletizing device 3 as well as for example by means of a trolley conveyor which travels over the textile machine 1, picks the bobbins 10 on same and then goes to a point of deposit, away from the textile machine 1. In this case no additional construction space is required next to the textile machine 1, so that an advantageous utilization of hall space is ensured.

Thanks to the intermittent conveyor 14 it is advantageously possible to transport bobbins 10 in a horizontal as well as in a vertical position. If the bobbins 10 are horizontal with their axis, centering in their longitudinal sense is ensured. The bobbins can furthermore be removed quickly in this manner from the textile machine 1. If the axes of the bobbins 10 are vertical, precise positioning of the bobbins is ensured whatever their diameter may be in relation to the tubes 11. By replacing the catch strip 20, different numbers and position locations can easily be provided for. In an advantageous embodiment the catch strip 20 is slid on the connecting element 32. Rapid replacement by another catch strip 20 is thereby possible. In order to avoid wrong occupation of catch strip 20 and lifting unit 4, sensors are installed to ascertain whether the catch strip 20 and the arrangement of the graspers 5 on the lifting unit 4 go together. In case of erroneous occupation, a signal is emitted for the operating personnel.

The invention is not limited to the embodiments shown. For example, the bobbins can be deposited on a pallet as well as in a container or some other buffer storage device. In fact, it will be apparent to those skilled in the art that various modifications and variations can be made in the present invention without departing from the scope or spirit of the invention. Thus, it is intended that the present invention cover such modifications and variations as come within the scope of the claims and their equivalents.

I claim:

1. A textile machine, comprising:
   at least one conveyor belt disposed along at least one side thereof for conveying cross-wound bobbins therealong;
   an intermittent conveying device disposed adjacent the front end of said conveyor belt in the direction of conveyance, said intermittent conveying device configured on an end stock of said textile machine and comprising means for receiving and positioning bobbins from said conveyor belt into a predetermined spaced apart pattern therealong;
   a palletizing device disposed relative said intermittent conveying device so as to retrieve said bobbins positioned therealong, said palletizing device comprising grasping means for transferring said bobbins from said intermittent conveying device to a receptacle in said predetermined spaced apart pattern; and
   a bobbin manipulating device operably disposed relative said conveyor belt and said intermittent conveying device for orienting said bobbins prior to said bobbins being positioned by said receiving and positioning means.

2. The textile machine as in claim 1, wherein said receiving and positioning means comprises means for positioning bobbins therealong through contact with protruding bobbin tubes extending from at least one side of said bobbins.

3. The textile machine as in claim 2, wherein said receiving and positioning means comprises a reciprocating ratchet conveyor, said ratchet conveyor having a conveying surface and a plurality of catches extending therefrom and configured for engaging said protruding bobbin tubes on its forward stroke and disengaging from said protruding bobbin tubes on its reverse stroke, said bobbins thereby being spaced apart along said ratchet conveyor depending upon the space between said catches while being conveyed to said palletizing device.

4. The textile machine as in claim 3, wherein said ratchet conveyor includes a hold-down device for using said catches to disengage from said protruding bobbin tubes on said reverse stroke.

5. The textile machine as in claim 4, wherein said catches are pivotal, said hold down device contacting said catches on said reverse stroke and causing said catches to pivot downward relative said conveying surface.

6. The textile machine as in claim 3, wherein said conveying surface comprises a roller track.

7. The textile machine as in claim 6, wherein said roller track comprises a plurality of roller strips disposed longitudinally adjacent each other, said roller strips disposed adjacent said catches being at a lower level than said other roller strips.

8. The textile machine as in claim 3, wherein said ratchet conveyor includes a pneumatic actuating device.

9. The textile machine as in claim 3, wherein the number and spacing of said catches disposed along said ratchet conveyor matches the number and spacing of bobbin positions defined in a row of a pallet to which said bobbins are to be loaded by said palletizing device.

10. The textile machine as in claim 3, wherein said catches are variably positionable along said ratchet conveyor.

11. The textile machine as in claim 3, wherein said catches are replaceable.

12. The textile machine as in claim 3, wherein said ratchet conveyor further comprises automatically readable markings for determining the number and position of said catches by a scanning device.

13. The textile machine as in claim 1, wherein said palletizing device comprises a lifting unit having a plurality of graspers equal in number to the number of bobbins which may be positioned along said intermittent conveyor.

14. The textile machine as in claim 13, wherein said palletizing device is disposed so as to travel along a rail above said intermittent conveyor, said graspers being raisable and lowerable between said intermittent conveyor and said receptacle.

15. The textile machine as in claim 13, wherein said graspers are configured to grasp said bobbins through contact with the bobbin tube extending from said bobbins.

16. The textile machine as in claim 1, wherein said intermittent conveyor and said bobbin manipulating device have an overall combined length essentially equal to that of said end stock of said textile machine.

17. A process for positioning bobbins received from a conveyor belt of a textile machine, said process comprising the steps of:
   transferring the bobbins from the textile machine conveyor belt to an intermittent conveyor device configured on an end stock of the textile machine;
   manipulating the bobbins with a manipulating device prior to said transferring so that the bobbins are oriented in the same direction and conicity along the intermittent conveyor device;
   automatically and sequentially positioning the bobbins along the intermittent conveying device in a spaced apart pattern which matches a pattern in a receptacle to which the bobbins will be transferred; and
   with a grasping device retrieving the bobbins from the intermittent conveyor in their spaced apart pattern and transferring the bobbins to a pallet having positions for the spaced apart bobbins.

18. The process as in claim 17, wherein said bobbins are deposited into a pallet by the grasping device generally directly in front of the textile machine.

19. The process as in claim 17, further comprising automatically arranging the bobbins in a row along the intermittent conveyor with a ratcheting conveyor device equal to the number and position of a row of bobbin positions of the pallet.

20. The process as in claim 17, further comprising determining the desired position and number of bobbins in the pallet and adjusting the device for positioning of the bobbins along the intermittent conveyor to achieve the desired position.

21. A bobbin positioning device configurable with a textile machine having a conveyor for conveying bobbins formed thereby to one end thereof, said device comprising:
- an intermittent conveying device disposed adjacent the front end of said textile machine conveyor in the direction of conveyance, said intermittent conveying device comprising means for receiving and positioning bobbins from said textile machine conveyor into a predetermined spaced apart pattern therealong through contact with protruding bobbin tubes extending from at least one side of said bobbins;
- a palletizing device disposed relative said intermittent conveying device so as to retrieve said bobbins positioned therealong, said palletizing device comprising grasping means for transferring said bobbins from said intermittent conveying device to a receptacle in said predetermined spaced apart pattern; and
- a bobbin manipulating device operably disposed relative said textile machine conveyor and said intermittent conveying device for positioning said bobbins into a desired orientation prior to said bobbins being positioned by said receiving and positioning means.

22. The device as in claim 2, wherein said receiving and positioning means comprises a reciprocating ratchet conveyor, said ratchet conveyor having a conveying surface and a plurality of catches extending therefrom and configured for engaging said protruding bobbin tubes on its forward stroke and digengaging from said protruding bobbin tubes on its reverse stroke, said bobbins thereby being spaced apart along said ratchet conveyor depending upon the space between said catches while being conveyed to said palletizing device.

23. The device as in claim 22, wherein said ratchet conveyor includes a hold-down device for causing said catches to disengage from said protruding bobbin tubes on said reverse stroke.

24. The device as in claim 23, wherein said catches are pivotal, said hold down device contacting said catches on said reverse stroke and causing said catches to pivot downward relative said conveying surface.

25. The device as in claim 20, wherein said conveying surface comprises a roller track.

26. The device as in claim 25, wherein said roller track comprises a plurality of roller strips disposed longitudinally. adjacent each other, said roller strips disposed adjacent said catches being at a lower level than said other roller strips.

27. The device as in claim 22, wherein said ratchet conveyor includes a pneumatic actuating device.

28. The device as in claim 22, wherein the number and spacing of said catches disposed along said ratchet conveyor matches the number and spacing of bobbin positions defined in a row of a pallet to which said bobbins are to be loaded by said palletizing device.

29. The device as in claim 22, wherein said catches are variably positionable along said ratchet conveyor.

30. The device as in claim 22, wherein said catches are replaceable.

31. The textile machine as in claim 22, wherein said ratchet conveyor further comprises automatically readable markings for determining the number and position of said catches by a scanning device.

32. The device as in claim 21, wherein said intermittent conveying device is configured on an end stock of said textile machine.

33. The textile machine as in claim 32, wherein said intermittent conveying device and said bobbin manipulating device have an overall combined length essentially equal to that of said end stock of said textile machine.

34. The device as in claim 21, wherein said palletizing device comprises a lifting unit having a plurality of graspers equal in number to the number of bobbins which may be positioned along said intermittent conveyor.

35. The device as in claim 34, wherein said palletizing device is disposed so as to travel along a rail above said intermittent conveyor, said graspers being raisable and lowerable between said intermittent conveyor and said receptacle.

36. The device as in claim 34, wherein said graspers are configured to grasp said bobbins through contact with the bobbin tube extending from said bobbins.

* * * * *

UNITED STATES PATENT AND TRADEMARK OFFICE
CERTIFICATE OF CORRECTION

PATENT NO. : 5,399,062
DATED : March 21, 1995
INVENTOR(S) : Gerhard Grabovszky

It is certified that error appears in the above-indentified patent and that said Letters Patent is hereby corrected as shown below:

Title page : application number, delete "107,348" and substitute therefor --107,248--.

Claim 4, line 2, delete "using" and substitute therefor --causing--.

Claim 22, line 1, delete "2" and substitute therefor --21--.

Signed and Sealed this

Thirteenth Day of June, 1995

Attest:

BRUCE LEHMAN

*Attesting Officer*          *Commissioner of Patents and Trademarks*